BEST AVAILABLE COPY

United States Patent [19]

MacDonald

[11] Patent Number: 4,667,093

[45] Date of Patent: May 19, 1987

[54] ELECTRONIC COIN MEASUREMENT APPARATUS WITH SIZE AND ACCELERATION DETECTION

[76] Inventor: J. Randall MacDonald, 6 Raftus Sq., Nepean, Ontario, Canada, K2J 1J3

[21] Appl. No.: 581,600

[22] Filed: Feb. 21, 1984

[30] Foreign Application Priority Data

Feb. 25, 1983 [CA] Canada .................................. 422430

[51] Int. Cl.⁴ ............................................... G01N 9/04

[52] U.S. Cl. ................................ 250/223 R; 250/560; 356/386; 194/326; 194/334

[58] Field of Search ........... 250/223 R, 223 B, 231 R, 250/560, 561; 356/381, 383-387; 194/1 K, 4 R, 4 C, DIG. 4, 99, 102; 133/3 R

[56] References Cited

U.S. PATENT DOCUMENTS 4,063,820 12/1977 Borgese .............................. 250/560
4,384,202 5/1983 Fasig .............................. 250/223 R
4,531,625 7/1985 Yonekura et al. ................. 356/386

*Primary Examiner*—David C. Nelms
*Attorney, Agent, or Firm*—Edward E. Pascal

[57] ABSTRACT

This invention distinguishes coins by electronically checking their various masses, diameters and thicknesses. The coins are subjected to a constant acceleration force, i.e., gravity, and slide along a side of a ramp, which results in different velocities for different kinds of coins. The speeds of the coin are measured at two different times at one location on the ramp, or alternatively at two different adjacent locations along the ramp. The width and thickness of the coin are also measured. It has been found that an accurate determination can be made of the designation of the coin based on correspondence between the acceleration (which is related to the mass), the width (which is specifically the diameter of a round coin), and the thickness, or a proportional section of the width and thickness with predetermined ranges of acceleration, width and thickness.

29 Claims, 18 Drawing Figures

BEST AVAILABLE COPY

BEST AVAILABLE COPY

BEST AVAILABLE COPY
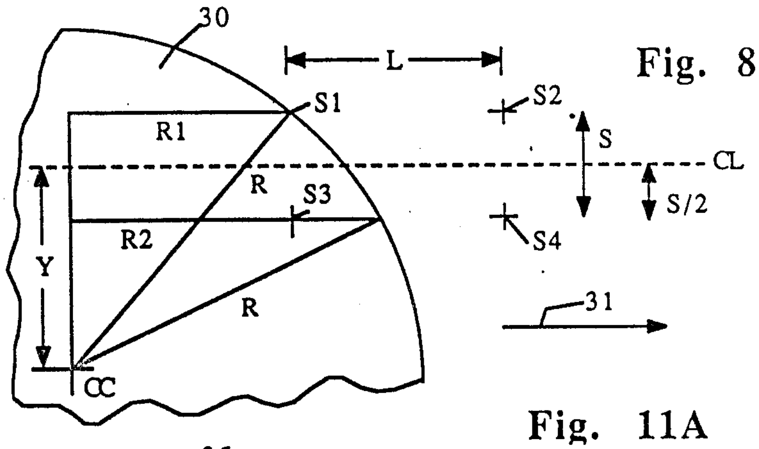
Fig. 8
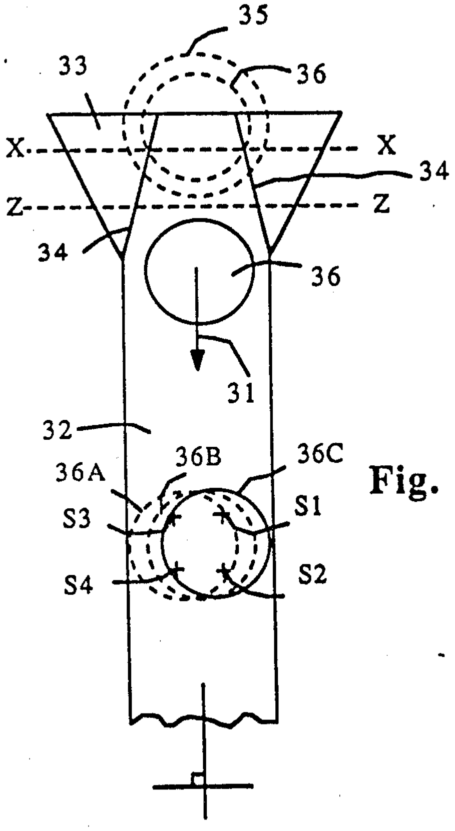
Fig. 9
Fig. 11A
(Section X-X)
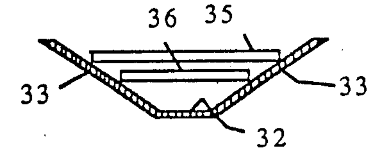
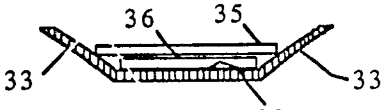
Fig. 11B
(Section Z-Z)
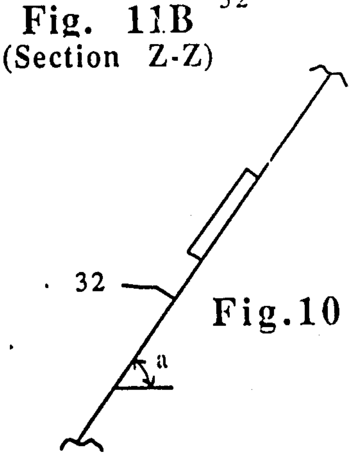
Fig.10

BEST AVAILABLE COPY

BEST AVAILABLE COPY

BEST AVAILABLE COPY

BEST AVAILABLE COPY

BEST AVAILABLE COPY

ELECTRONIC COIN MEASUREMENT APPARATUS WITH SIZE AND ACCELERATION DETECTION

This invention relates to coin identifying apparatus, and particularly to apparatus which can differentiate between different coin denominations. The invention can also be used to measure dimensions and to designate an object accelerating smoothly under the influence of a constant force along a defined path in a manner in which the width of the object in the direction of acceleration does not change as the object moves.

Several techniques have been used in the past for distinguishing the denomination of coins. Usually a coin is checked electromagnetically, i.e., by moving or spinning it in a magnetic field, and eddy currents induced therein, interacting with the magnetic field, cause a change in the trajectory of a coin moving down a ramp or passing through a predefined region.

Coins are also sometimes distinguished by mechanical separation based on a particular type of coin taking a particular trajectory. Different trajectories for different coins are sometimes obtained by bouncing a coin. Thicknesses of coins are sometimes measured by the use of feelers or pincers. Coins can also be distinguished by allowing them to roll down a ramp in which progressively larger sized holes are located, the coins being sorted by falling sideways through the holes.

The present invention distinguishes coins by distinguishing between a combination of their various masses, diameters and thicknesses electronically. The coins are subjected to a constant acceleration force, i.e., gravity, and also slide against one side of a ramp. This results in different velocities as different coins roll down the ramp. The speeds of the coin at two different times at one location or at two different adjacent locations along the ramp are measured. As well, the width in the direction of acceleration and the thickness are measured, or a proportional section of the width and thickness of the coin. It has been found that an accurate determination can be made of the designation of the coin based on correspondence between the acceleration (which is related to the mass), the width (which is specifically the diameter of a round coin or a section thereof), and the thickness or a section thereof, corresponding to predetermined ranges. For example, in one prototype of the invention, I have been able to distinguish between American and Canadian nickels, dimes and quarters while identifying (and rejecting) pennies of both countries. Consequently the dirt, gumming of moving parts and other factors which generally require significant maintenance of a mechanical type coin chute are substantially eliminated in the present invention, since the coin chute is unimpeded.

The invention is not limited to the determination of the designation of coins, but can be used to measure dimensions and mass characteristics of any object which can be accelerated under the influence of a constant accelerating force which has its acceleration affected by its mass and in which the width of the object in the direction of acceleration does not change as the object moves (of which a rolling cylinder is a simple example).

According to the preferred form of the invention, the time between the leading edge of the object passing two adjacent points under constant acceleration (i.e. gravity) and experiencing some friction is measured, and the time between the trailing edge of the object passing the same adjacent points is measured. The difference between the times gives a value related to the acceleration of the object.

According to another embodiment of the invention, the time between the leading and trailing edges of the object passing one point is measured, and the time between the leading and trailing edges of the object passing a point further down the ramp is measured. The difference in times in this case also gives a value related to the acceleration of the object.

According to another form of the invention the leading edge of the accelerating object which has its acceleration affected by its mass passes a predetermined point and the time that the leading edge passes a second point following the first point is determined. The time of the leading edge passing a third point along a path following a first point is also determined, as well as time that the leading edge passes a fourth point following the first point. The time of the trailing edge of the object passing any of the second, third or fourth points following the first point is also determined.

According to a transfer function to be described later relating to the preferred embodiment (or others which can be derived once the principles of this invention are understood), a signal corresponding to the acceleration of the object can be determined from the time measurements, as well as the diameter, and width. The preferred structure for determining the leading edge of the object passing a predetermined point is to use a light-emitting diode-photosensor pair, the beam of which is interrupted by the object. In the case of a coin, it is preferred that a light-emitting diode coupled to a photo-transistor across a coin chute down which the coin is rolling, should be used.

The concept of determining a size of an object which interrupts and is scanned by one or more light beams is not novel, and is described in U.S. Pat. Nos. 4,192,612, 4,198,165, 4,097,159, 3,921,003 and 4,063,820. However none utilize the concept or structure described herein.

U.S. Pat. No. 4,063,820, for example, which issued Dec. 20th, 1977 to RCA Corporation describes the concept of moving an object at an known speed past a beam of light; by knowing the beam angle, the speed of the object and the time lapse between the passage of the object and a reference point and the point of the beam interruption, a dimension of the object can be determined. Since the object is carried along a moving belt at a controlled and known speed, the time difference between the leading and trailing edge of the object provides a determination of a particular dimension between the leading and trailing edges of the object. However the mass cannot be determined from that method, which parameter is critical to the present coin determination invention.

In the present invention, the speed of the object to be measured is unknown. Indeed, the speed of the object in this invention is variable, dependent on its mass, friction against the side of the ramp and on the angle of the ramp down which it rolls. According to the preferred embodiment of the present invention the speed of the object is measured at two times, and from this an acceleration factor can be determined. The time between the leading edge of the object passing a given point and its trailing edge provides an indication of the diameter, once the speed and acceleration have been determined. A light emitting diode-phototransistor pair having an axis at an angle to the ramp axis parallel to the ramp

BEST AVAILABLE COPY floor also provides means for determining the thickness of the object as will be described below. After applying signals from the phototransistors through a microprocessor or equivalent logic circuit which performs a predetermined algorithm which effects the required transfer functions, the resulting signals representing acceleration (i.e. mass), diameter and thickness are compared with corresponding ranges in a lookup table, which results in an indication of the classification or determination of the object according to the values stored in the lookup table.

The invention in general is an apparatus for measuring a designation of an object accelerating smoothly under the influence of a constant acceleration force along a defined path whereby the acceleration varies with the mass of the object in a manner in which the width of the object in the direction of acceleration does not change as the object moves, comprising apparatus for determining the acceleration of the object, apparatus for determining the width of the object in the direction of acceleration, and apparatus for comparing the measured acceleration and width with a predetermined acceleration and predetermined width, and for indicating a designation for the object in response thereto. A refined designation can be obtained by measuring the thickness and comparing it with a predetermined thickness.

It is believed clear that the concepts described herein can be used to determine a designation for general objects meeting the criteria described above. However for ease of understanding, the description below will be directed to the example of detection of coins and the determination of their designations.

A better understanding of the invention will be obtained by reference to the detailed description below in conjunction with the following drawings, in which:

FIG. 8 is a schematic diagram showing the locations of sensors relative to a sector of a coin;

FIG. 9 is a face view of the inside of a coin chute,

FIG. 10 is a representative side view of a coin chute,

FIGS. 11A and 11B are cross sectional views of the coin chute along section lines X and Z respectively of FIG. 9, and FIGS. 12, 13A, 13B and 13C are flow charts concerned with operation of the microprocessor of the invention.

Figure 1A:
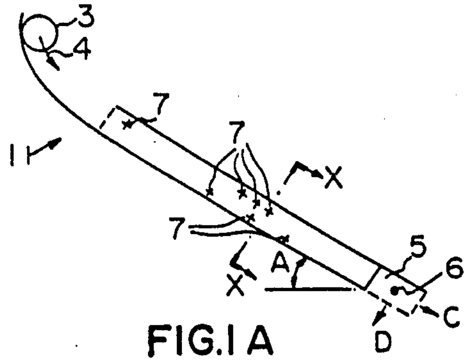
FIG. 1A is a schematic side view of a coin chute.
Figure 1B:
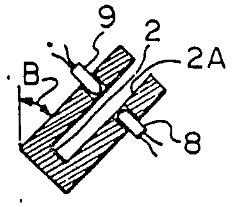
FIG. 1B is a section of the coin track of FIG. 1A along section X—X.

Turning first to FIG. 1A, a coin chute 1 is generally shown which contains a floor 2, angled generally downwardly at the angle A relative to the horizontal. Preferably the chute is tilted to the side (as shown in FIG. 1B) at the angle B relative to the vertical. A coin 3 obtains entrance to the coin chute in a well known way, and rolls along the floor 2 in the direction shown by the arrow 4.

At the bottom of the chute a mechanical gate 5 is located, which is operated by a solenoid 6. As the coin rolls down the chute and enters the gate 5, the state of the solenoid 6 will determine whether the coin is accepted and passes in one direction C or in another direction D. The precise configuration of the gate 5 is not the subject of the present invention; suffice to say that operation of the solenoid 6 preferably will cause the coin to be accepted into an accept chute and inoperation will cause the coin to be passed into a reject chute.

Energy beam-sensor pairs, the location of each pair of which is shown by reference numeral 7, are located across the chute so that their beams are interrupted by the presence of a coin passing therebetween down the chute. An energy beam-sensor pair is shown as a light emitting diode 8 and mutually coupled phototransistor 9 in FIG. 1B, disposed on opposite sides of the coin chute. According to the preferred embodiment light emitting diode-phototransistor pairs are used, but other forms of energy beam-sensor pairs can be used in which an interruption of the beam can be detected, such as infrared emitter-phototransistor pairs, etc.

The tilt of the chute at angle A relative to the horizontal is required to cause the coin to move under the influence of gravity down the chute. The sideways tilt of the chute at angle B relative to the vertical is preferred in order to have the coin lie flat against the lower-most side 2A, whereby a sharp and consistent interruption of the light beam will be obtained, and also to provide friction against the side of the coin. It has also been found that angle A should be approximately 45°, although different angles can be used. It has been found that angle B can be up to approximately 30°, but should not be much greater due to the retarding effect of excessive friction between the coin and the side of the chute. As noted earlier the angle B should be adjusted just sufficiently to have the coin lie flat against the lower side 2A of the chute.

It should be noted that the theoretical acceleration of the coin is determined by the acceleration due to gravity less the frictional force divided by the mass of the coin. Thus the acceleration is a function of the mass, and a value related to the mass and acceleration can be determined. In a working prototype, in which the ramp sides were fabricated of plexiglass, with the ramp angles given above, there was sufficient friction to afford reliable distinguishment of coin denominations. However other materials can be used within the principles of this invention, so long as sufficient friction is imparted the object or coin to differentiate the acceleration.

Figure 2A:
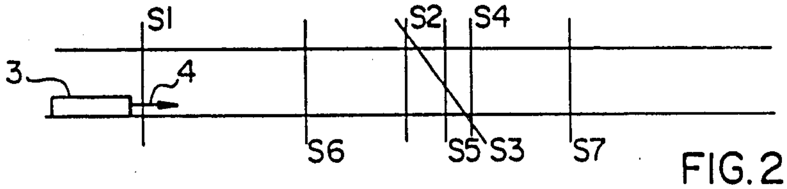
FIG. 2A is a schematic plan of the coin track parallel to the track floor.
Figure 2B:
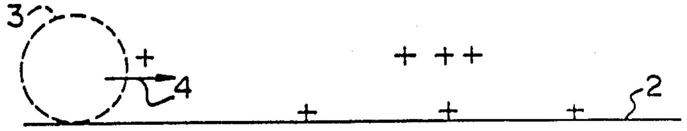
FIG. 2B is a schematic side view of the coin track.

FIGS. 2A and 2B are schematic top and side views of the chute respectively. The lines S1-S7 show the axes of the light (or energy) beams, i.e. a line joining the axes of the light emitting diode-phototransistor pair. The crosses shown in FIG. 2B illustrate the elevation of the light beam axes (to be referred to below simply as the light beam), above the floor 2 of the chute. The references S1-S7 in FIG. 2A correspond to the cross points illustrated directly below them in FIG. 2B. Thus the coin 3 rolls and accelerates along the floor 2 in the direction of arrow 4. As it rolls and accelerates it passes between the light emitting diode and photodetector pairs located along axis S1-S7, interrupting the light beams, and causing a change in output signal of the coupled phototransistors.

Consider now the interruption of the light beams S1, S2, S3 and S4. The moving coin first interrupts light beam S1, at which a timer is enabled or started. A time $T_1$ is then determined between the interruption of the next light beam S2 and the interruption of light beam S3 by the leading edge of coin 3. The coin then interrupts light beam S4, and a second time $T_2$ is determined between the S3 and S4 light beam interruptions. The trailing edge of the coin then clears light beam S2, establishing a third time interval $T_3$ after the leading edge interruption of light beam S4. For measurement using this embodiment, both S2 and S4 must at some time be simultaneously interrupted by the coin. It is preferred that their separation should be less than 50% of the minimum diameter of the coin to be measured.

A time $T_4$ is then determined between the trailing edge of the coin passing light beam S2 and the trailing edge passing light beam S4.

It has been found that an acceleration value signal ACCEL of the coin can be generated related to the times determined as noted above according to the following transfer function:

$$\text{ACCEL} = \frac{1}{T_1 + T_2 + 2T_3 + T_4}\left[\frac{1}{T_4} - \frac{1}{T_1 + T_2}\right].$$

Further, it has been found that a diameter value signal DIA of the coin can be generated related to the times and the acceleration referred to above according to the transfer function:

$$\text{DIA} = \frac{T_1 + T_2 + T_3}{T_1 + T_2} + \text{ACCEL}[T_3^2 + T_3(T_1 + T_2)].$$

It will be noted that the above acceleration expression provides a value which is largely independent of coin speed. However the slope of the track directly effects the determined values. It has been found that unique values of acceleration are produced for specific coin masses and coin track slope for a particular track side material.

It should be noted that the diameter of the coin is determined by measuring the time $(T_1+T_2+T_3)$ required for the coin to move over its own diameter (or a distance proportional to diameter) divided by the time $(T_1+T_2)$ required to move a known distance (the separation of S2 and S4). Since the speed of the coin is changing due to constant acceleration, the acceleration factor used in the diameter transfer function corrects the integrating effects of the measurements.

It should be noted that in determining ACCEL and DIA, sensor S3 is not strictly required since the time periods determined by sensor S3 ($T_1$ and $T_2$) only appear as a sum $(T_1T_2)$ in the equations.

Figure 3:
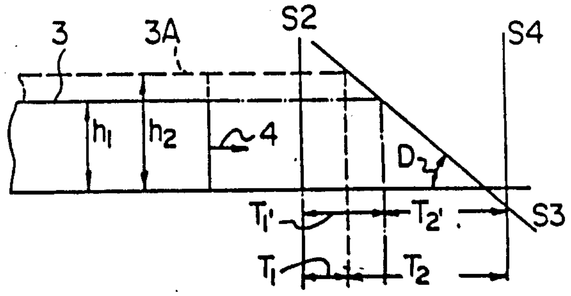
FIG. 3 is a schematic illustration of the plan view of a section of the track which will be used to explain how coin thicknesses are determined.

The thickness of the coin is determined by the use of light beams S2, S3 and S4. The operation of this structure will be described below with reference to FIG. 3.

It should be noted that light beam S3 is angled upstream relative to the axis of the track, from the side against which the coin lies, while light beams S1, S2 and S4 are perpendicular to the track and the direction of movement of the coin. Assume a coin 3 of thickness $h_1$ moving in the direction 4, in FIG. 3, which is a plan view of a portion of the track. From the time the leading edge of the coin interrupts light beam S2 to the time it interrupts light beam S3 will be considered time $T_1'$. From that time to the time of interruption of light beam S4 will be considered time $T_2'$.

Consider now a coin 3A having a thickness $h_2$, which is greater than the thickness $h_1$ of coin 3. The leading edge will interrupt light beam S3 at an earlier time $T_1$. The time following this interruption to the interruption of light beam S4 will be time $T_2$. Clearly the ratio of time $T_1'$ to $T_2'$ is larger than the ratio of time $T_1$ to $T_2$. A differential in thickness of the coin can be determined using these times, or their ratios. The times $T_1$ and $T_2$ of course define the same times as previously noted with respect to determination of ACCEL and DIA.

It has been determined that a signal representing the thickness TH of a coin can be expressed according to the transfer function $$TH = \frac{T_2}{T_1 + T_2} + \frac{\text{ACCEL}}{2}(T_1T_2)$$

As noted earlier, for this set of functions to hold the separation of light beams S2 and S4 are not critical, but they must be covered by the coin at the same time. Indeed, it is preferred that they should be less than 50% of the minimum diameter of coins to be measured. The angle D of light beam S3 to the lower side of the track should be as small as possible, to provide the largest differences between times T' and T for given differences in thickness $h_1$ and $h_2$. Beam S3 should intersect the lower side of the track as close to light beam S4 as possible. The length and position of the base of the triangle on the lower side of the track enclosing angle D formed by the axes S2 and S3 should be as close a possible to the length and position of the lower side of the track between the S2 and S4 beams. However the separation of beams S2 and S4 and the angle of beam S3 should be chosen such that beam S2 will be intersected by the coin before beam S3 for all expected thicknesses.

Figure 4:
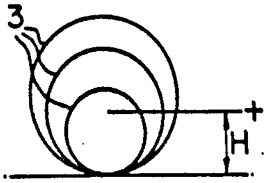
FIG. 4 illustrates the diameters of various size coins next to each other.

Turning now to FIG. 4, coins 3, having various diameters are shown. The height H of the sensors S1–S4 above the floor of the chute should be approximately 75% of the diameter of the smallest diameter coin to be measured. This will provide a maximum difference between diameters while maintaining a sufficient diameter for measurement on the smallest coin. However, the light beam S3 need not be in the same plane as light beams S2 and S4. If the latter situation is the case, then the determination of the thickness will become dependent on the diameter as well as the thickness of the coin. This will take the form of a constant for a given diameter and thickness which will be accounted for in the calibration of the apparatus effectively cancelling its effect. In addition, sensors S2 and S4 need not be the same height above the coin track. If the latter situation is the case, however, extra factors are introduced in the diameter determinations, but are also cancelled during the calibration process. This also applies to the thickness measurement if the light beams S3 and S4 do not intersect the lower side of the track at the same point.

A person understanding the principles of this invention will now be able to design other sensor geometries and time measurement strategies, containing sensor-beam axes perpendicular to and/or slanted to the acceleration vector of the object, and to derive the resulting acceleration and thickness values. For example, the TH function described above determined the thickness based on measurements from the leading edge of the object. A simple mirror-image reversal in the S3 geome-

BEST AVAILABLE COPY try, and appropriate changes in the TH function would allow measurement from the trailing edge of the object. In addition, other dimensions of the object can be determined by similar techniques. For example, by using an arrangement of 2 slanted sensors in opposite directions, both the leading and trailing edge thicknesses of an object can be measured.

Returning now to FIGS. 2A and 2B, it should be noted that three light beams S5, S6 and S7 are located close to the floor of the track. The purpose of these three light beams is to detect whether the coin is actually rolling or sliding, or whether it is bouncing, since a bouncing coin will give an erroneous determination in the system described above. The three light beams S5, S6 and S7 are located so that they all must be interrupted as the coin rolls down the track. Otherwise the coin is bouncing, and should be rejected.

Accordingly coins having a non-circular but symmetrical periphery and which are sliding but not rolling down the track will be accepted, but such irregular and non-symmetrical coins which are rolling will bounce along the floor, and in such cases will normally not interrupt one or more of the light beams S5, S6 and S7. To be acceptable, the detected width of the coin as it moves must be identical for every rolling or sliding mode.

The light beams S6 and S7 are located such that they are intersected by a coin immediately before light beam S2 is obstructed and immediately after the obstruction of light beam S4 has been removed respectively. The locations noted above are determined with respect to the largest diameter coin to be determined. Light beam S5 is located mid-way between S2 and S4 along the track.

Figure 5:
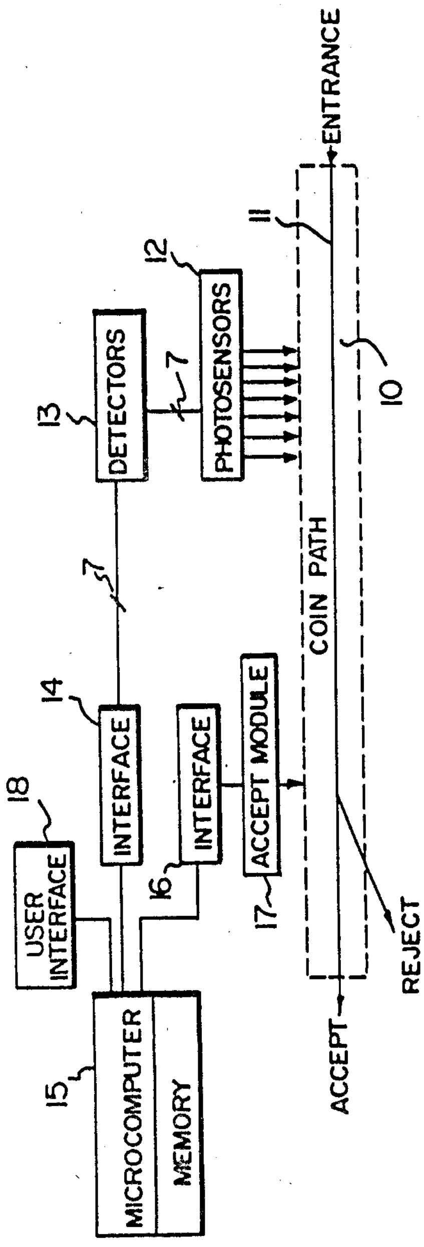
FIG. 5 is a block diagram of the electronic portion of the invention.

FIG. 5 is a block diagram of the electronic portion of the invention. A coin passes along a track 10 in the direction of path 11. At the end of path 11 the track diverges to an ACCEPT or REJECT direction. Coins passing along the track 10 from the track entrance roll along the track 10 and pass to the ACCEPT or REJECT exit depending on the operation of the apparatus to be described below.

The light emitting diode-phototransistor pairs, to be referred to below as photosensors 12 sense the leading or trailing edges of the coin as described earlier. The arrows extending from photosensors 12 represent the direction of the photosensor beams to sense the leading and trailing edges of the coin passing along the track, by means of the beams being interrupted or re-established.

The photosensors are connected to the inputs of a plurality of detectors 13, the outputs of which are connected via a microprocessor interface 14 to a microcomputer 15. The microcomputer can be any well known type which includes a microprocessor, memory, timers, etc. alternatively, several photosensor detectors can be multiplexed into one detector.

The microcomputer also connects to an output interface circuit 16 of well known type, the output of which is connected to an accept module 17 which will be described below. The accept module includes a solenoid which drives a movable core, pin or mechanical gate and causes the coin to pass either to the ACCEPT or REJECT exits.

In addition, the values of the coins which are accepted can be totalized by the microcomputer as successive coins pass into the ACCEPT exit.

The microcomputer is also preferably connected to a user interface 18, which can consist of a message display, keypad or keyboard input, etc.

Figure 6:
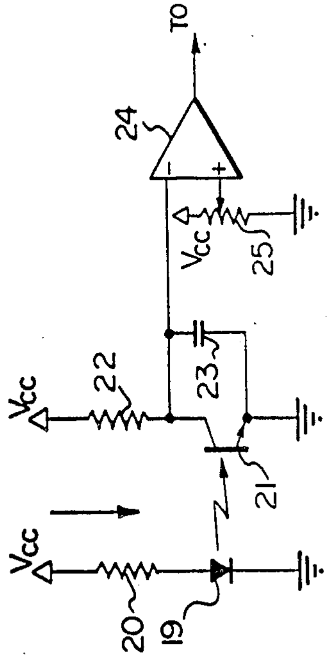
FIG. 6 is a schematic of the photosensor interface with the block diagram of FIG. 5.

A photosensor and detector as formed in one prototype are shown in FIG. 6. A light emitting diode 19 is connected via resistor 20 between a power source $V_{cc}$ and ground. Light-coupled to it across the coin track as described earlier is a phototransistor 21 which is connected between ground and a power source $V_{cc}$ via a load resistor 22. A capacitor 23 is connected across the output of phototransistor 21, which has a value chosen to eliminate signal bounce; the rise time of the output signal of the phototransistor collector is thereby controlled.

Other structures which couple light to the photosensors could be used as alternatives. For example, the side of the chute opposite the photosensors could be formed of light conductive material, using one light source at one end. The material would be configured to release light across the track from the photosensors.

The collector of phototransistor 21 is connected to the inverting input of a comparator 24, which has its non-inverting input connected to the variable tap of a potentiometer 25 which is connected between ground and potential source $V_{cc}$. The output of comparator 24 is connected to the microcomputer interface 14. The circuit just described is repeated for each phototransistor and light emitting diode pair connected thereto. Alternatively a signal conditioner or comparator circuit may be multiplexed between the various sensors.

With the circuit just described, the output of the detector to the microcomputer interface is logic 1 when the light path is not obstructed, and is logic 0 when the light path is obstructed by a coin.

The potentiometer 25 provides means for setting the switching voltage of the output comparator. This can be used to compensate for light emitting diode-phototransistor spacing and alignment variations, and to ensure uniform switching points between the light to dark, and dark to light transitions.

Figure 7:
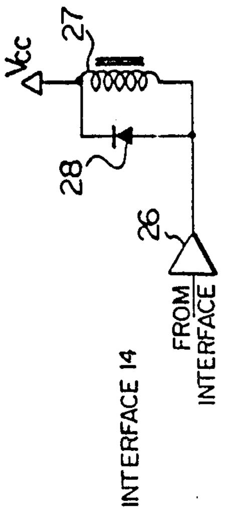
FIG. 7 is a schematic of an accept module interface with the block diagram of FIG. 5.

The accept module interface 17 is shown in FIG. 7. This preferably is comprised of a buffer 26 which has its input connected to the output interface 16 of the microcomputer and has its output connected to a terminal of a solenoid 27. The other terminal of solenoid 27 is connected to power source $V_{cc}$. A diode 28 is connected across the coil of the solenoid in a conventional manner to limit the voltage applied to the output of the buffer when the solenoid coil is switched off. The microcomputer generates a signal which is translated through interface 16 and buffer 26 and causes operation of solenoid 27.

Figure 12:
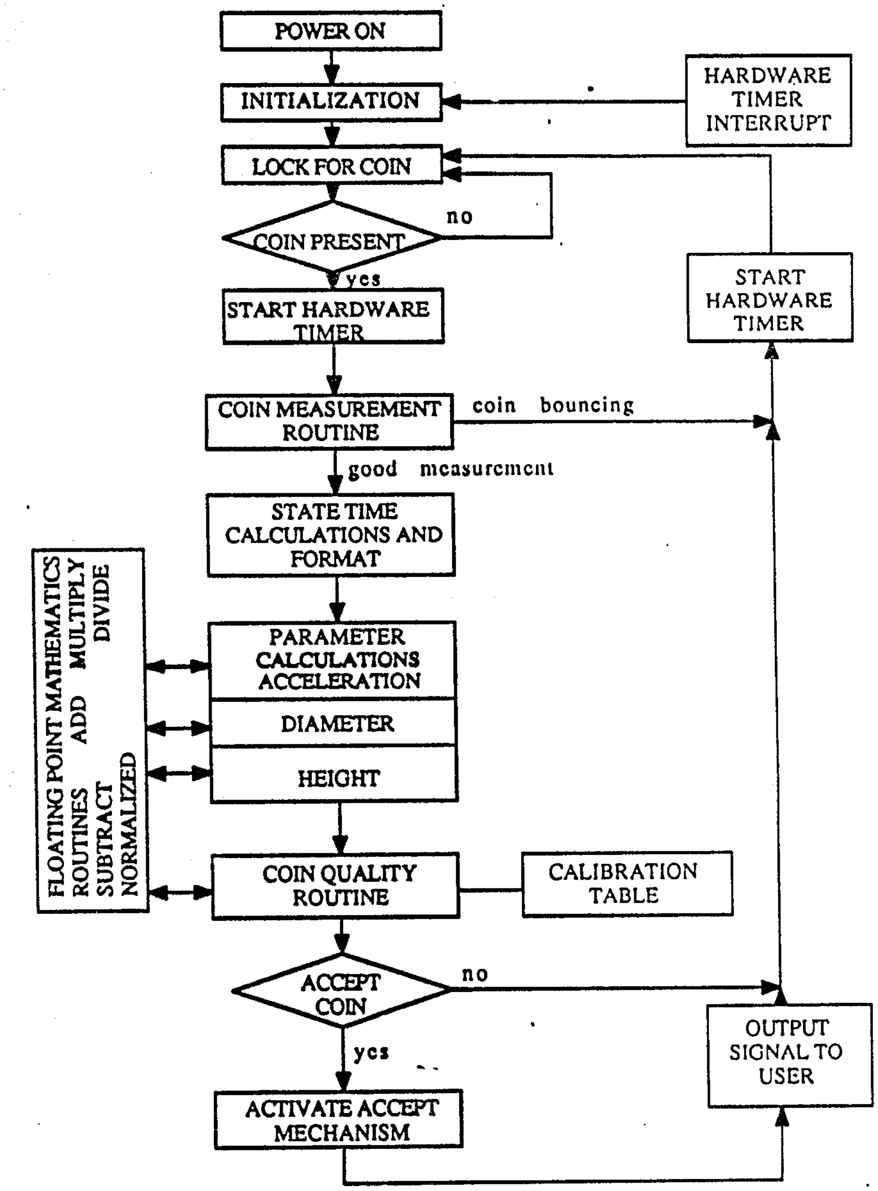

The logic levels of the detectors 13 are sensed by the microcomputer 15. The microcomputer stores in firmware a sequence of instruction signals defining its operation in accordance with the flow-charts shown in FIG. 12. The specific sequence of electrical steps to accomplish the flow charts shown in FIG. 12 can have many different forms and the specific steps thereof are considered to be within the skill of a person knowledgeable in the art of microcomputer operation.

The initialization step of the flow chart is well known in the art of microcomputers; all memory locations are checked for a proper functioning, all peripherals (in this case the sensors) are checked to ensure that they show logic 1 (unobstructed), etc. If any test fails an error condition should be indicated on the user interface.

BEST AVAILABLE COPY

After initialization is complete the microcomputer determines whether a coin is present. The parallel interface 14 is read to check to see whether the sensor associated with light path S1 shows a 0 logic level, indicating that a coin has entered the coin track and has interrupted that light beam.

Assuming that a logic 0 level has been sensed, a timer is then configured and then initialized with a value. It is then started at some fixed clock rate. A counter independently counts at the clock rate. The microprocessor can read the state of the counter at any time for an indication of elapsed time.

(Once the coin measurement and coin accept operation is complete, the timer is stopped. If for some reason the measurement takes longer than the initial value of the counter, the counter will reach a predetermined value, such as 0, and cause an interrupt to the microprocessor. The initialization and self-check functions should then be performed again in an attempt to locate the fault area).

Once the timer has been started, the coin measurement routine is entered. The microcomputer continuously monitors the sensors, looking for their specific states. When a new state is detected, the timer is read and the indicated time is stored in a variable which indicates the start time of that state.

As a coin rolls past the sensors the following states occur

| | S1 | S6 | S2 | S3 | S4 | S5 | S7 |
|---|---|---|---|---|---|---|---|
| No coin | 1 | 1 | 1 | 1 | 1 | 1 | 1 |
| Coin inserted | 0 | X | X | X | X | X | X |
| No Bounce #1 | X | 0 | X | X | X | X | X |
| Time 1 (T1) | X | X | 0 | 1 | 1 | 1 | 1 |
| Time 2 (T2) | X | X | 0 | 0 | 1 | X | 1 |
| Time 3 (T3) | X | X | 0 | 0 | 0 | X | 1 |
| No Bounce #2 | X | X | 0 | 0 | 0 | 0 | 1 |
| Time 4 (T4) | X | X | 1 | X | 0 | X | 1 |
| End of Measurement | X | X | 1 | 1 | 1 | 1 | 1 |
| No Bounce #3 | X | X | 1 | 1 | 1 | 1 | 0 |
| End of coin | 1 | 1 | 1 | 1 | 1 | 1 | 1 |

in which
1 denotes an unobstructed path,
0 denotes an obstructed path, and
X denotes that the sensor state is not examined, or is not of consequence.

The microprocessor looks for these states and uses the measurement of the length of time of the states to determine the time $T_1$–$T_4$, and subsequently the coin dimensions and acceleration.

The bounce detect sensors are monitored at specific times. If a bounce is detected, the routine exits immediately, stops the counter, and returns to the "look for the coin" routine. The coin automatically returns to the customer, since the solenoid has not been activated. The location of the three bounce detection loops, one for each of the bounce detect sensors, is chosen so as not to affect detection of the coin sensor state transitions.

Figure 13A:
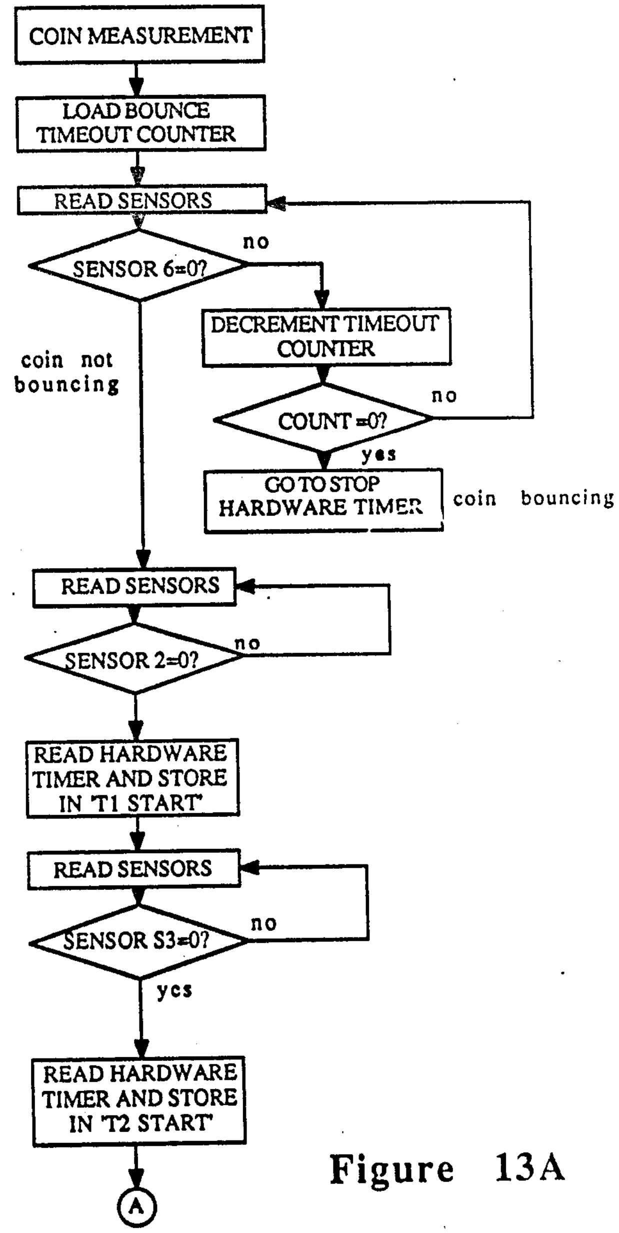
Figure 13B:
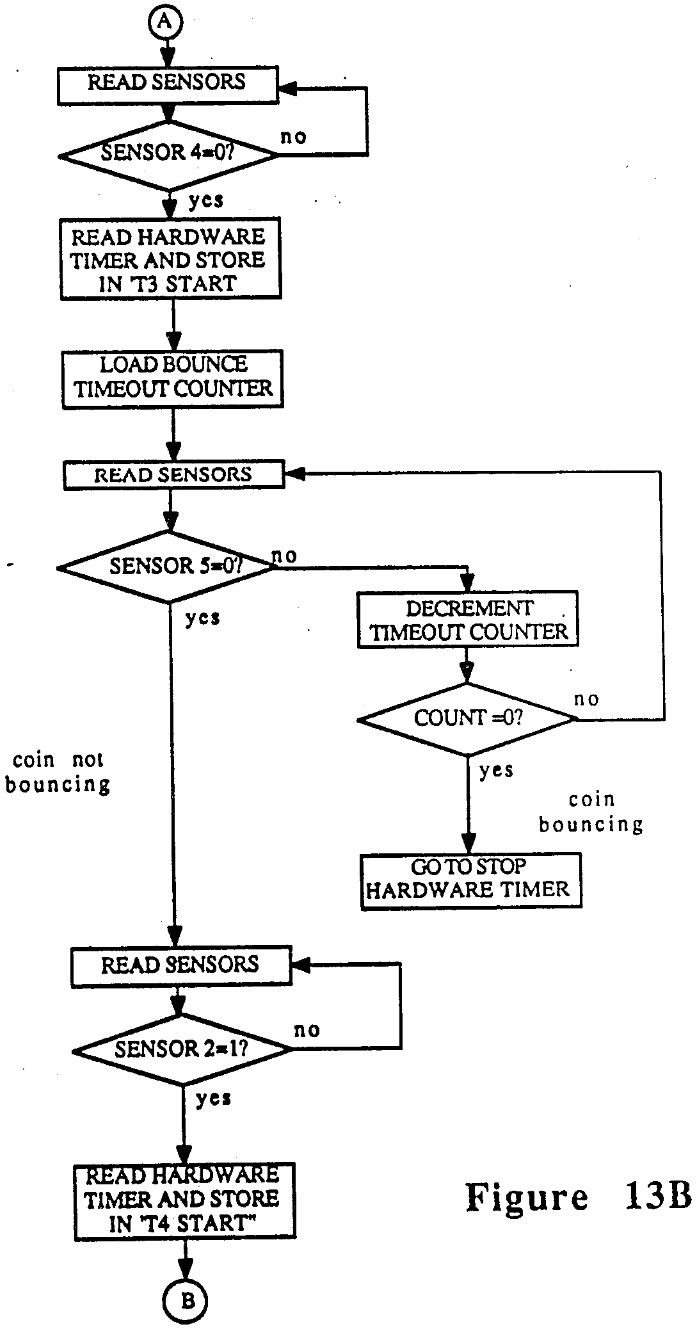
Figure 13C:
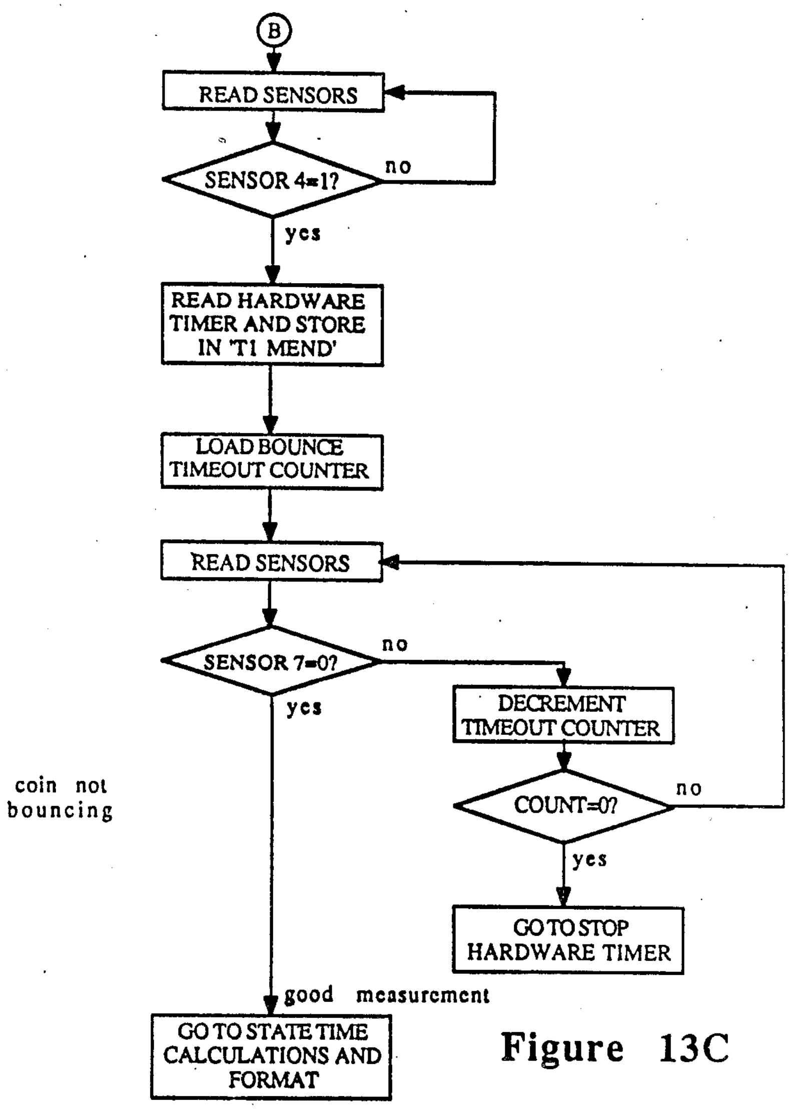

The coin measurement routine is shown in the flow chart which starts from FIG. 13A, and continues through FIG. 13B and FIG. 13C.

Following the coin measurement routine, the start times for each state are stored in the microcomputer memory. The state time start measurements are subtracted to yield the binary counts of the lengths of the state. The parameters are then calculated by the microcomputer and the acceleration, diameter and the thickness is determined according to the transfer function formuli ACCEL, DIAM and TH described earlier. Accordingly the microcomputer receives the state signals based on the photosensors being interrupted or the light beam being re-established, and operates the transfer functions described earlier.

The microcomputer then enters a coin quality routine. The acceleration, diameter and thickness of the coin having now been calculated, the coin quality routine attempts to match the parameters with those in a calibration table stored in the memory. If all three parameters match, then the determination or value of the coin is assigned. The accept module can be activated at this point to accept or retain the coin. Otherwise the coin is rejected.

The calibration or look-up table contains the ranges specifying the maximum and minimum determination value for each ACCEL, DIAM and TH parameter for each expected coin. For different coins or objects to be determined, the ranges for at least one of the ACCEL, DIA and TH parameters must not overlap. As an example, if the detector is desired to accept 25¢, 5¢ and 10¢ coins, the calibration will contain high and low values for each of the three coin denomination diameters, high and low values for each coin denomination acceleration and high and low values for each denomination of coin thickness, totalling 18 values in total.

Digital signals corresponding to the determined values are compared with the ranges in the table to determine whether they fit between any of the high and low values. If all three parameters fit within ranges for a particular single denomination of coin, and if they are non-zero, then an output signal is generated by the microcomputer to interface 16, passing through buffer 26, and causes operation of solenoid 27. Solenoid 27 operates an accept gate of conventional construction causing the coin to pass to the ACCEPT exit. Otherwise the coin passes to the REJECT exit and is returned to the customer.

After the accept mechanism has been actuated, a signal can be provided to the user and the timer stopped. The microcomputer then returns to the routine whereby it senses the logic levels of detectors 13 and attempts to detect the presence of coins.

It should be noted that since the value of the coin has been determined, the microcomputer can be used to totalize sequences of coins. It can also operate a user interface which can provide a message to the user, and can include a solenoid which operates a package dispenser, whereby goods matching a determined price for which sufficient coinage has been added, is provided to the customer. In addition, the microcomputer could calculate the required change and operate a change return mechanism.

In order to generate the upper and lower limit of the look-up table, a large number of coins of each expected type can be run through the coin chute. The microcomputer can calculate the mean values of acceleration, diameter and thickness and standard deviations of the readings; upper and lower limits of each parameter can then be assigned. Alternatively, the values can be input via the user interface.

While the above description has been directed to a mechanism for sensing of coins, it will be clear to a person skilled in the art that the invention can be used to detect other kinds of objects such as boxes sliding on a track (moving under the influence of gravity), cylinders having diameter much greater than height, right parallelopipeds, spheres, etc. In addition, other transfer functions can be deduced and employed using different timing combinations. Further, it becomes clear that the apparatus can be used to detect orientation of an object, in which the width of the object is matched against stored signals representative of the width in various orientations that the object is expected to take. The resulting matching or non-matching can be used to direct a robotic or other form of reorienting mechanism, track selection mechanism, etc.

The present invention can also be provided in a form which does not require rolling and tilting of the coin in order to specifically locate the coin edge along a rolling track. In some configurations, rolling of the coin along an edge could in some circumstances introduce a problem whereby the coin bounces, changing the direction of travel of the coin. In the present embodiment, the coin can slide flat on one face centrally down the axis of a track which is pitched downwardly, but is not tilted to one side. Thus the bounce problem is substantially avoided. The track is wider than coins to be carried, since various diameters of coins are to accommodated. The requirement placed on the chute however is that it must allow the coin to slide along a straight line past a group of edge sensors. The sensors are of the type similar to those described earlier.

Turning to FIG. 8, a portion of a coin 30 is shown travelling in the direction of direction arrow 31 along a coin chute. Four sensors S1, S2, S3 and S4 are disposed as shown at the corners of a parallelogram, preferably a square or rectangle, a line passing through sensors S1 and S2, and a line passing through sensors S3 and S4 being parallel to each other and parallel to the direction of travel 31 of the coin 30. The sensors S1 and S2 are separated from sensors S3 and S4 by a distance S. The direction of travel 31 of the coin is parallel to a line CL, which extends through points half-way between sensors S1 and S2, and S3 and S4 respectively, i.e. defining the distances S/2. The distance Y represents the distance between the center CC of the coin and the line CL in a direction perpendicular to the line CL. L represents the distance between sensors S1 or S3 and S2 or S4 respectively.

The distance R1 is a line representing the distance extending perpendicularly from an extension of the line Y to the edge of the coin, along an axis passing through sensors S1 and S2. The distance R2 is a line representing the distance extending perpendicularly from the line Y to the edge of the coin along an axis passing through sensors S3 and S4. Thus radii R of the coin extend from the center CC to the edge of the coin where the lines labelled R1 and R2 intersect.

Provided that the path of the coin is in a direction parallel to the line CL, the distance $Y=(R2^2-R1^2)/2S$, or $Y=K1(R2^2-R1^2)$, where K1 is a constant for a given distance S.

Clearly the distance Y can be determined by measuring the distances R1 and R2, and can be determined as long as all of the four sensors are intersected as the coin passes down the chute. R1 and R2 are of course half the distance across the coin at the levels of the sensors S1 and S2, and S3 and S4, respectively.

As the coin passes down the chute, and past the sensors, the following state diagram will be observed:

| | S1 | S2 | | S3 | S4 |
|---|---|---|---|---|---|
| | 1 | 1 | | 1 | 1 |
| TA | 0 | 1 | TD | 0 | 1 |
| TB | 0 | 0 | TE | 0 | 0 |
| TC | 1 | 0 | TF | 1 | 0 |

-continued

| S1 | S2 | S3 | S4 |
|---|---|---|---|
| 1 | 1 | 1 | 1 |

The timing between the two truth tables is not shown and is variable depending on actual coin path.

With the output states of the sensors as noted above, providing signals as described earlier, letting L=1, the following transfer functions are preferred to be used for this embodiment:

(1) Calculate $$ACCEL_{12}/2=\frac{1}{TA+2TB+TC}\left[\frac{1}{TC}-\frac{1}{TA}\right]$$

Since the sensors are close together, this value of acceleration will be approximately the same as $$ACCEL_{34}/2=\frac{1}{TD+2TE+TF}\left[\frac{1}{TF}-\frac{1}{TD}\right]$$

(2) The two measurements from one edge to the other edge of the coin along a line passing through the sensors S1 and S2 (2R1) and along a line passing through sensors S3 and S4 (2R2) are then determined.

$$2R1=D_{12}=\frac{TA+TB}{TA}+\frac{ACCEL}{2}\left[TB^2+TB(TA)\right]$$

$$2R2=D_{34}=\frac{TD+TE}{TD}+\frac{ACCEL}{2}\left[TE^2+TE(TD)\right]$$

(3) The distance Y between the line CL and the center of the coin is then determined.

$$Y=\left|\frac{R2^2-R1^2}{2S}\right|,\ \text{but } 2R2=D34,\ 2R1=D12$$

$$Y=\left|\frac{D34^2-D12^2}{8S}\right|$$

(4) the actual diameter of the coin D can now be determined as follows (the actual radius is represented by R).

$$R^2=R2^2+(Y-S/2)^2$$

$$D^2/4=(D34^2/4)+(Y-S/2)^2$$

$$D^2=D34^2+(2Y-S)^2$$

where $$Y=\left|\frac{D34^2-D12^2}{8S}\right|$$

In conclusion, since S is a constant

If D12>D34 then $Y=D12^2-D34^2$ and $D^2=D12^2+(2Y-S)^2$ or,

If D34>D12 then $Y=D34^2-D12^2$ and $D^2=D34^2+(2Y-S)^2$.

Thus $D^2$ is determined from the larger of D12 or D34. Similar equations may be derived to determine D from the smaller of D12 or D34. D of course is a signal representing the actual diameter of the coin, and is the square root of $D^2$.

Thus it is clear that a determination of the diameter of the coin in this embodiment does not depend on a prior knowledge of the location of a rolling edge of the coin.

With an understanding of the above, a person skilled in the art may now derive transfer function equations for other sensor configurations to determine the coin diameter D, such as with sensors S3 and S4 staggered in the direction 31 from sensors S1 and S3.

FIG. 9 is a face view of a coin chute which has a mechanism for locating the coins approximately centrally in the chute sending the coins in a straight line past the edge sensors. The chute contains a channel portion 32 along which coins slide on one face thereof. The top of the chute is flared outwardly as shown in regions 33, which are bent upwardly along lines 34 which extend from the edges of the flared regions toward the top of the coin chute and toward an axis of the coin chute, or along radii of arcs having axes parallel to the lines 34. Thus in section the flared portion of one embodiment of the coin chute appears as shown in FIGS. 11A and 11B. The flat bottom portion 32 of the coin chute clearly is narrower along section X—X shown in FIG. 11A than it is along section Z—Z as shown in FIG. 11B. Thus the flat bottom portion gradually widens from the top of the coin chute as the flared portions narrow, the flared portions thus guiding coins toward the central axis of the chute.

It will of course be clear that various factors may cause the coin to pass sensors S1, S2, S3 and S4 in any of the positions 36A, 36B or 36C, for example, although it is preferred that it should pass down the actual axis of the chute. However it is important in this embodiment that the coin should travel along a straight path, and intersect all four sensors as it passes. In the present embodiment gravity is used to ensure that the coin travels along a straight path. The sensors are arranged as described earlier with reference to the plane of the coin chute, but at corners of a square or rectangle.

The distance S and any lateral displacement of each of the sensor pairs S1, S2 and S3, S4 from the other pair should be such that the acceleration of the coin during intersection of all the sensors should be constant.

The placement of the pair of sensors S3 and S4, and of the pair of sensors S1 and S2 should be such that the truth table noted above is satisfied, that is that both sensors of the sensor pairs S1, S2 and S3, S4 must be covered at the same time (but not necessarily both pairs at the same time).

Thus the present embodiment removes a constraint in the design of the earlier embodiment of the chute which was described with reference to FIGS. 1-4 and was required to locate the edge of the coin as it travelled. The present embodiment can also be combined with the embodiment described with references to FIGS. 1-4.

The sensors interface with the electronic circuitry portion of the invention described with reference to FIGS. 5-7, which implements the signal transfer functions described with respect to the present embodiment.

A person understanding this invention may now conceive of other structures or variations of this invention or other embodiments, which use the principles defined herein. All are considered to be within the sphere and scope of the invention as defined in the claims appended hereto.

I claim:

1. Apparatus for determining the designation of a coin comprising:

(a) a chute for carrying the coin along a predetermined path, having a floor angled generally downwardly and a side tilted to cause the coin to lie flat against and become affected by friction against it as the coin passes down the chute under the influence of gravity;

(b) energy beam emitter-sensor pairs located across the chute so as to cause said beam to be interrupted by the coin passing down the chute, (i) a first said pair located with its beam axis perpendicular to said path at an upper portion of said chute, (ii) a second pair located with its beam axis perpendicular to said path at a lower portion of said chute, (iii) a third said pair located at a still lower portion of said chute with its beam axis at an acute angle to said path from said wall and directed upwardly along the chute toward the other side of the chute, (iv) and a fourth pair located at a still lower portion of said chute with its beam axis perpendicular to said path, the distance between the second and fourth pairs being less than the width of the narrowest width coin to be designated, (c) means connected to said sensors for detecting a leading edge of the coin passing the first sensor, the time different ($T_1$) of the leading edge passing between the second and third sensors, the time difference ($T_2$) of the leading edge passing between the third sensor and fourth sensor, the time difference ($T_3$) between the leading edge passing the fourth sensor and the trailing edge passing the second sensor, and the time difference ($T_4$) between the trailing edge of the coin passing the second sensor and the fourth sensor, (d) means for determining the acceleration, diameter and thickness of the coin depending on said time differences of the leading and trailing edges of the coin passing at least the second, third and fourth sensors, and (e) means for indicating a designation for said coin based on the determined acceleration, diameter and thickness of said coin being within predetermined ranges therefor.

2. Apparatus as defined in claim 1, in which the means for determining the acceleration, diameter and thickness is comprised of means for generating an ACCEL signal relating to the acceleration of the coin by operating the transfer function $$\mathrm{ACCEL} = \frac{1}{T_1 + T_2 + 2T_3 + T_4}\left[\frac{1}{T_4} - \frac{1}{T_1 + T_2}\right],$$

means for generating a DIA signal relating to the diameter of the coin by operating the transfer function $$\mathrm{DIA} = \frac{T_1 + T_2 + T_3}{T_1 + T_2} + \mathrm{ACCEL}[T_3^2 + T_3(T_1 + T_2)],$$

means for generating a signal TH relating to the thickness of the coin by operating the transfer function $$TH = \frac{T_2}{T_1 + T_2} + \frac{ACCEL}{2}(T_1T_2).$$

3. Apparatus as defined in claim 2 including a memory for storing signals corresponding to predetermined ranges of acceleration, diameter and thickness, means for comparing the ACCEL, DIA and TH signals with corresponding ones of said ranges, and means for generating a signal signifying a predetermined designation for said coin upon correspondence of said ACCEL, DIA and TH signals within predetermined ones of said ranges.

4. Apparatus as defined in claim 1, in which the distance between the axes of the second and fourth energy beam emitter-sensor pairs is not greater than about 50% of the minimum diameter of coins to be designated.

5. Apparatus as defined in claim 1, in which the distance between the axes of the second and fourth energy beam emitter-sensor pairs is less than the minimum diameter of coins to be designated, and in which the length and position of the base of a triangle along said wall defined by the axes of the second and third emitter-sensor pairs and said wall is as close as possible to the distance and position respectively of the intersection of the axes of the second and fourth emitter-sensor pairs with said wall, and said acute angle of the axis of the third beam-sensor pair with said wall is as small as possible but sufficient such that the second emitter-sensor pair is interrupted before the third emitter-sensor pair for all expected coin thicknesses as the coin passes down the chute.

6. Apparatus as defined in claim 1, in which the distance between the axes of the second and fourth energy beam emitter-sensor pairs is less than the minimum diameter of coins to designated, in which the length and position of the base of a triangle along said wall defined by the axis of the second and third emitter-sensor pairs and said wall is as close as possible to the distance and position respectively of the intersection of the axes of the second and foruth emitter-sensor pairs with said wall and said acute angle of the axis of the third emitter-sensor pairs with said wall is as small as possible but sufficient such that the second emitter-sensor pair is interrupted before the third emitter-sensor pair for all expected coin thickness as the coin passes down the chute and in which the height of the senosrs perpendicular to the floor of the cute are about 75% of the diameter of the smallest coin to be designated.

7. Apparatus as defined in claim 1, in which the distance between the axis of the second and fourth energy beam-emitter-sensor pairs is less than the minimum diameter of coins to be designated, in which the length and position of the base of the triangle along said wall defined by the axes of the second and third emitter-sensor pairs and said wall is as close as possible to the distance and position respectively of the intersection of the axes of the second and fourth emitter-sensor pairs with said wall and said acute angle of the axis of the thrid emitter-sensor pair with said wall is as small as possible but sufficient such that the second emitter-sensor pair is interrupted before the third beam-sensor pair for all expected coin thicknesses as the coin passes down the chute and in which the height of the sensors perpendicular to the floor of the chute are the same, and about 75% of the diameter of the smallest coin to be designated.

8. Apparatus defined in claim 1, in which the energy beam emitter-sensor pairs are mutually coupled light emitting diode-phototransistor pairs disposed in holes in opposite walls of the chute.

9. Apparatus as defined in claim 1, in which the distance between the axes of the second and fourth energy beam emitter-sensor pairs is less than the minimum diameter of coins to be designated, in which the distance and position of the base of a triangle along said path defined by the axes of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thicknesses as the coin passes down the chute and in which the height of the sensors perpendicular to the floor of the chute are about 75% of the diameter of the smallest coin to be designated, and further including coin bounce detectors for detecting bounce of a coin from said floor in the region of said emitter-sensor pairs, and for causing aborting of said determination upon detection of the bounce of the coin.

10. Apparatus as defined in claim 3, in which the distance between the axes of the second and fourth energy beam emitter-sensor pairs is less than the minimum diameter of coins to be designed, in which the length and position of the base of a triangle along said wall defined by the axes of the second and third emitter-sensor pairs and said wall is a close as possible to the distance and position respectively of the intersection of the axes of the second and fourth emitter-sensor pairs with said wall, in which said acute angle is as small as possible but sufficient such that the second emitter-sensor pair is interrupted before the third emitter-sensor pair for all expected coin thicknesses as the coin passes down the chute, and in which the height of the sensors perpendicular to the floor of the chute are about 75% of the diameter of the smallest coin to be designated, a fifth emitter-sensor pair located adjacent to said floor between the second and fourth emitter-sensor pairs, a sixth emitter-sensor pair located adjacent to said floor upstream of the second emitter-sensor pair such that its beam would be interrupted before the second emitter-sensor pair by the leading edge of the largest coin to be designated, and a seventh emitter-sensor pair located adjacent to said floor downstream of the fourth emitter-sensor pair such that its beam would be interrupted immediately after the trailing edge of the largest coin to be designated passes the fourth emitter-sensor pair, the axes of the fifth, sixth and seventh emitter-sensor pairs forming coin bounce detectors.

11. Apparatus as defined in claim 10, in which each energy beam emitter-sensor pair is comprised of a light emitting diode and phototransistor coupled thereto disposed on opposite sides of the chute, each phototransistor being connected to one input of a comparator, the other input of the comparator being connected to a variable voltage source for adjusting the threshold thereof, and further including a capacitor connected across the output of the phototransistor having value selected to substantially eliminate bounce in the output signal of the phototransistor.

12. Apparatus as defined in claim 11, further including a solenoid for operating a gate at the bottom of said chute upon being energized and means for operating said solenoid whereby a coin passing down the chute can pass through the gate upon a predetermined coin denomination being indicated, the chute including a reject opening for passing the coin in the event the solenoid is not energized.

13. Apparatus as defined in claim 11, further including a sensor interface connected to the outputs of said comparators, and a microcomputer including memory connected to said interface for operating said transfer functions and thereby determining said time differences, acceleration, diameter and thickness, generating an indicating signal to drive said indicating means, an output interface, and a solenoid connected to the output interface for receiving said indicating signal whereby the solenoid is operated and facilitates passage of the coin into an accept exit to the chute, and whereby inoperation of the solenoid facilitates passage of the coin into a reject exit to the chute, the microcomputer further determining whether a coin has bounced depending on whether the beams of the fifth, sixth and seventh beam-sensor pairs have been interrupted, and causing rejection of said coin if any of the beams of the fifth, sixth and seventh beam sensor pairs have not been interrupted but the beams of the remaining beam-sensor pairs have been interrupted.

14. Apparatus as defined in claim 2, in which said means for operating said transfer functions and indicating said designations is comprised of a microprocessor connected to said sensors.

15. Apparatus as defined in claim 2, in which the distance between the axes of the second and fourth energy beam emitter-sensor pairs is approximately or less than 50% of the minimum diameter of coins to be designated.

16. Apparatus as defined in claim 3, in which the distance between the axes of the second and fourth energy beam emitter-sensor pairs is approximately or less than 50% of the minimum diameter of coins to be designated.

17. Apparatus as defined in claim 2, in which the distance between the axes of the second and fourth energy beam emitter-sensor pairs is less than the minimum diameter of coins to be designated, and in which the length and position of the base of a triangle along said wall defined by the axes of the second and third emitter-sensor pairs and said wall is as close as possible to the distance and position respectively of the intersection of the axes of the second and fourth emitter-sensor pairs with said wall, and said acute angle of the axis of the third beam-sensor pair with said wall is as small as possible but sufficient such that the second emitter-sensor pair is interrupted before the third emitter-sensor pair for all expected coin thicknesses as the coin passes down the chute.

18. Apparatus as defined in claim 3, in which the distance between the axes of the second and fourth energy beam emitter-sensor pairs is less than the minimum diameter of coins to be designated, and in which the length and position of the base of a triangle along said wall defined by the axes of the second and third emitter-sensor pairs and said wall is as close as possible to the distance and position respectively of the intersection of the axes of the second and fourth emitter-sensor pairs with said wall, and said acute angle of the axis of the third emitter-sensor pair with said wall is as small as possible but sufficient such that the second emitter-sensor pair is interrupted before the third emitter-sensor pair for all expected coin thicknesses as the coin passes down the chute.

19. Apparatus as defined in claim 2, in which the distance between the axes of the second and fourth energy beam emitter-sensor pairs is less than the minimum diameter of coins to be designated, in which the length and position of the base of a triangle along said wall defined by the axis of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thickness as the coin passes down the chute and in which the height of the sensors perpendicular to the floor of the chute are about 75% of the diameter of the smallest coin to be designated.

20. Apparatus as defined in claim 3, in which the distance between the axes of the second and fourth energy beam emitter-sensor pairs is less than the minimum diameter of coins to be designated, in which the length and position of the base of a triangle along said wall defined by the axis of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor is interrupted before the third emitter-sensor pair for all expected coin thickness as the coin passes down the chute and in which the height of the sensors perpendicular to the floor of the chute are about 75% of the diameter of the smallest coin to be designated.

21. Apparatus as defined in claim 2, in which the distance between the axes of the second and fourth energy beam emitter-sensor pairs is less than the minimum diameter of coins to be designated, in which the length and position of the base of the triangle along said wall defined by the axes of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thicknesses as the coin passes down the chute and in which the height of the sensors perpendicular to the floor of the chute are the same, and about 75% of the diameter of the smallest coin to be designated.

22. Apparatus as defined in claim 3, in which the distance between the axes of the second and fourth energy beam emitter-sensor pairs is less than the minimum diameter of coins to be designated, in which the length and position of the base of the triangle along said wall defined by the axes of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thicknesses as the coin passes down the chute and in which the height of the sensors perpendicular to the floor of the chute are the same, and about 75% of the diameter of the smallest coin to be designated.

23. Apparatus defined in claim 2, in which the energy beam emitter sensor pairs are mutually coupled light emitting diode-phototransistor pairs disposed in holes in opposite walls of the chute.

24. Apparatus defined in claim 3, in which the energy beam emitter-sensor pairs are mutually coupled light emitting diode-phototransistor pairs disposed in holes in opposite walls of the chute.

25. Apparatus as defined in claim 2, in which the distance between the axes of the second and fourth energy beam emitter-sensor pairs is less than the minimum diameter of coins to be designated, in which the distance and position of the base of a triangle along said path defined by the axes of the second and third emitter-sensor pairs and said wall is as close as possible to the distance and position respectively of the intersection of the axes of the second and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thicknesses as the coin passes down the chute and in which the height of the sensors perpendicular to the floor of the chute are about 75% of the diameter of the smallest coin to be designated, and further including coin bounce detectors for detecting bounce of a coin from said floor in the region of said emitter sensor pairs, and for causing aborting of said determination upon detection of bounce of the coin.

26. Apparatus as defined in claim 3, in which the distance between the axes of the second and fourth energy beam emitter-sensor pairs is less than the minimum diameter of coins to be designated, in which the distance and position of the base of a triangle along said path defined by the axes of the second and third emitter-sensor pairs and said wall is as close as possible to the distance and position respectively of the intersection of the axes of the secor^d and fourth emitter-sensor pairs with said wall and said acute angle of the axis of the third emitter-sensor pair with said wall is as small as possible but sufficient such that the second emitter-sensor pair is interrupted before the third emitter-sensor pair for all expected coin thicknesses as the coin passes down the chute and in which the height of the sensors perpendicular to the floor of the chute are about 75% of the diameter of the smallest coin to be designated, and further including coin bounce detectors for detecting bounce of a coin from said floor in the region of said emitter-sensor pairs, and for causing aborting of said determination upon detection of bounce of the coin.

27. Apparatus as defined in claim 3, further including a solenoid for operating a gate at the bottom of said chute upon being energized and means for operating said solenoid whereby a coin passing down the chute can pass through the gate upon a predetermined coin denomination being indicated, the chute including a reject opening for passing the coin in the event the solenoid is not energized.

28. Apparatus as defined in claim 11, further including a solenoid for operating a gate at the bottom of said chute upon being energized and means for operating said solenoid whereby a coin passing down the chute can pass through the gate upon a predetermined coin denomination being indicated, the chute including a reject opening for passing the coin in the event the solenoid is not energized.

29. Apparatus as defined in claim 3, in which said means for operating said transfer functions and indicating said designations is comprised of a microprocessor connected to said sensors.

* * * * *